July 27, 1965
S. MITTLER
3,197,555
FABRIC CABLE
Filed April 6, 1962
3 Sheets-Sheet 1
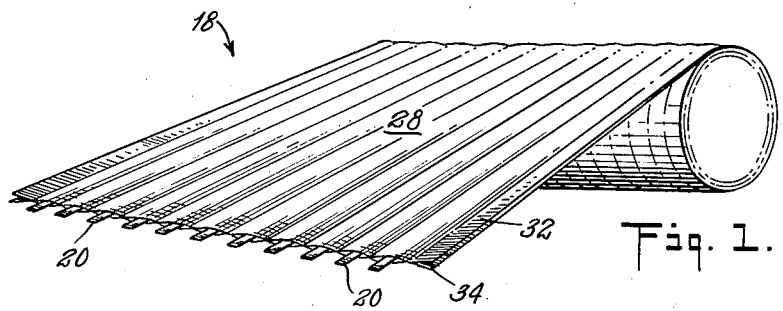
Fig. 1.
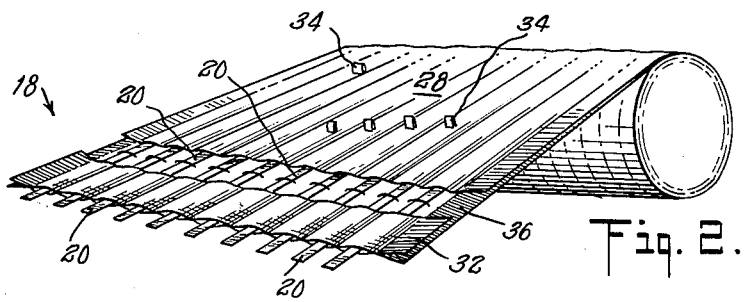
Fig. 2.
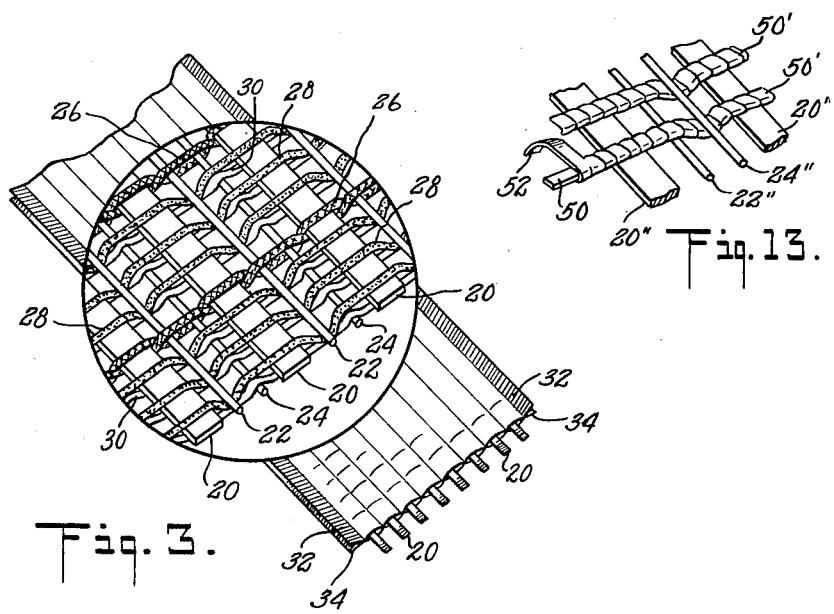
Fig. 3.
Fig. 13.
INVENTOR.
SHELDON MITTLER
BY Howard Myles Schwinger
ATTORNEY July 27, 1965  S. MITTLER  3,197,555
FABRIC CABLE Filed April 6, 1962  3 Sheets-Sheet 2

INVENTOR.
SHELDON MITTLER
BY Howard Myles Schwinger
ATTORNEY

July 27, 1965  S. MITTLER  3,197,555
FABRIC CABLE

Filed April 6, 1962  3 Sheets-Sheet 3

INVENTOR.
SHELDON MITTLER
BY
Howard Myles Schwinge
ATTORNEY 3,197,555
FABRIC CABLE
Sheldon Mittler, 81 St. Marks Ave., Freeport, N.Y.
Filed Apr. 6, 1962, Ser. No. 185,589
3 Claims. (Cl. 174—117)

This invention relates to a fabric cable and more particularly to a flat multi-conductor cable in tape form.

It is amongst the primary objects of the present invention to provide flat, multi-conductor cable which may simply and readily be tapped.

It is another important object of the present invention to provide flat cable in tape form having heat dissipating characteristics and unusual physical strength.

It is still a further object of the present invention to provide highly flexible cable of the above class which can readily be adapted to meet spatial and mounting complexities.

It is yet another object of the present invention to provide miniaturized, multi-conductor cable which may readily and economically be mass produced in tape form.

A fuller understanding of the invention and the manner in which its objective and advantages may be realized will become apparent from the following detailed description thereof taken in connection with the accompanying drawings wherein:

FIG. 1 is a perspective view of a flat, multiconductor cable in accordance with the present invention.

FIG. 2 again shows the cable of FIG. 1 in perspective but with conductors exposed for interconnection in accordance with the present invention.

FIG. 3 is an enlarged view showing details of the woven structure of the cable of the preceding figures.

FIG. 13 is an enlarged view showing details of a shielded cable in accordance with the present invention.

Figure 4:
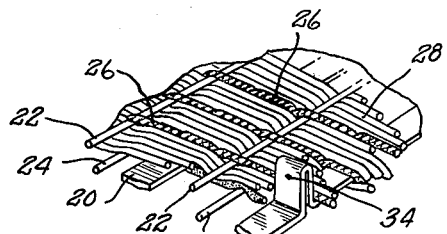
FIG. 4 is an enlarged view showing one of the interconnecting conductive tabs of FIG. 2 and associated structure in detail.

Referring now to the drawing, a section of flat cable in accordance with the present invention is shown in FIG. 1 and 2 in the form of an elongate strip which may be rolled for convenience in handling. The cable, designated generally by numeral 18, essentially consists of a plurality of spaced linear conductors 20 shielded by insulation. As may be best seen in FIG. 3, the cable is of a loosely woven construction being formed by weaving conductive and insulative threads together. The conductive fabric is woven of fiber glass and copper, amongst other materials, in accordance with existing techniques of the textile art as noted in the afore-described co-pending application.

Figure 5:
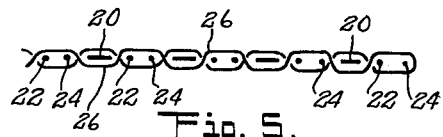
FIG. 5 is a diagrammatic sectional view of the cable of FIG. 1 showing the base or locking weave.

In this embodiment of the invention the warp of the woven cable consists of a series of spaced apart conductive threads 20 having insulating threads 22 and 24 positioned therebetween. The linear warp threads are held together by a non-conductive base or locking thread 26 which forms part of the weft. Locking thread 26 is completely looped about the warp at regularly occurring intervals, being locked about conductors 20 as it passes both back and forth across the weft (see FIG. 5) to form a loop. As will be noted in FIG. 3, the warp encircling loops formed by base thread 26 are somewhat spaced apart (see FIG. 3) and leave a large portion of the conductive warp exposed.

The conductive warp is covered and hence insulated, on the top and bottom thereof, by pull out threads 28 and 30, respectively. Like base thread 26, the pull out threads form a part of the weft, looping back and forth across the same. The loops formed by the pull out threads are closely spaced so as to reliably insulate the conductors.

Figure 6:
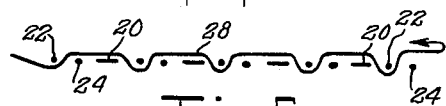
FIG. 6 is a diagrammatic sectional view of the cable of FIG. 1 showing the arrangement of the upper pull out thread.
Figure 7:
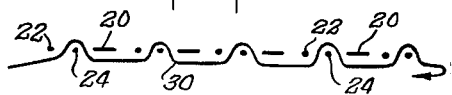
FIG. 7 is a diagrammatic sectional view of the cable of FIG. 1 showing the arrangement of the lower pull out thread.

As may be seen particularly in FIGS. 6 and 7, one continuous pull out thread is provided for the top side of the cable and another continuous pull out thread is provided for its underside. Unlike base thread 26, the pull out threads are not locked to the warp but are merely interlaced with the same for reasons hereinafter appearing. This is accomplished by weaving the upper pull out thread, for example, under the same warp threads as it passes back and forth across the weft rather than passing the same under and over the same warp threads in the manner of base thread 26. The latter procedure results in locking while the former procedure merely anchors the thread to the warp. Both pull out threads are therefore anchored to the warp and not locked thereto.

Top and bottom frills, 32 and 36 respectively, are formed at each edge of the warp. The top frill is formed by pull out thread 28 and the bottom frill by pull out thread 30. The frills are merely portions of the weft which extend outwardly of the warp to edge the weave longitudinally and are made up of a plurality of individual loops formed by the repeated reversal of the pull out threads in the weaving of the cable.

If it is desired to remove a portion of the weft to expose the conductors over a certain length of the cable, the frill is cut at each end of the area of removal. This results in the breaking of frill loops. Once this is done, the pull out thread is broken on two places and that portion of the pull out thread in the area of removal can be removed from the weave merely by pulling on the same.

The thread may be withdrawn from either edge of the warp regardless of which frill is cut. Only one of the frills need be cut as aforesaid for removal of the weft from one of the two sides of the warp. If weft, however, is to be removed from the top side of the cable, then the upper frill is severed and conversely, the bottom frill is severed if weft is to be removed from the bottom of the flat cable.

By reason of the foregoing it may be seen that the insulating weft may be removed from one or both sides of the cable to expose the conductors for interconnection. Base thread 26, which is locked to the warp, will not be removed by pulling and will remain in the weave. Its widely spaced loops, however, present no significant problem with regard to interconnection and contact. In fact, the regularly occurring base thread may be utilized as a visual distance guide in weft removal particularly if its color varies from that of the pull out thread.

Figure 12:
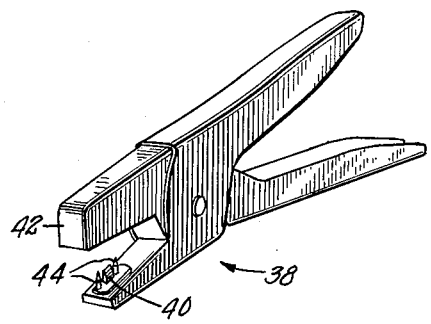
FIG. 12 is a perspective view of a crimping tool in accordance with the present invention.

Conductors may also be exposed for interconnection by deforming the same as shown in FIG. 4 wherein a conductive tab 34 is shown extending outwardly of the weft. Such a tab may be formed by the hand operated die 38 shown in FIG. 12. When the jaws of the die are closed upon a conductor, that portion of the conductor clamped by the die is forced by lower punch 40 into upper mold 42 and crimped to form tab 34. The tool is provided with arms 44 to space the weft apart and expose the conductor for crimping.

Figure 8:
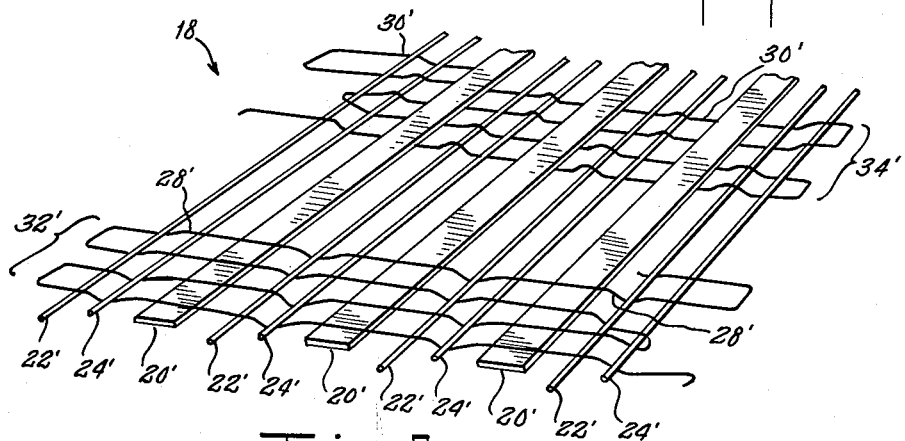
FIG. 8 is a diagrammatic perspective view showing the upper and lower pull out threads with relation to the warp.
Figure 10:
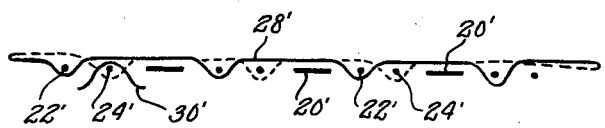
FIG. 10 is a diagrammatic sectional view of the cable of FIG. 9 showing, primarily, the upper pull out weave.
Figure 9:
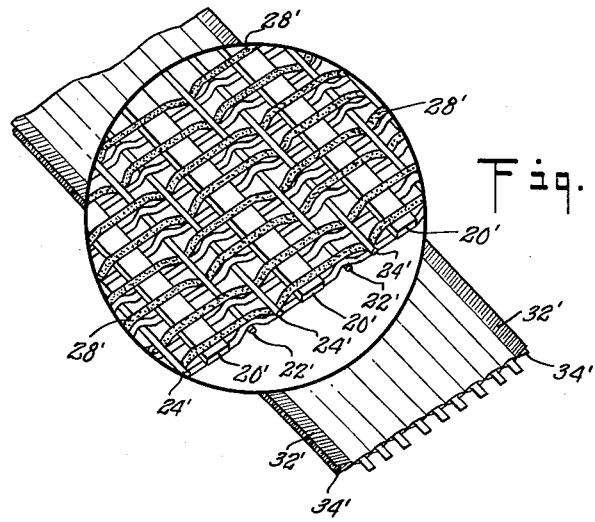
FIG. 9 is an enlarged view showing details of another woven cable in accordance with the present invention.

Base or locking thread 26 may be eliminated from the weave as is illustrated in FIGS. 8, 9, and 10. In this embodiment the pull out threads assume a locking function although the same may readily be removed from the weave, as before. This is accomplished, as shown in the drawings, by passing the upper pull out thread over warp thread 22 every two rows rather than by passing the said pull out thread uniformly under the said warp thread as previously. The same will apply to the lower pull out thread. The only limitation here is that the pull out threads may only be withdrawn from one edge of the weave in the area of removal and not from either edge as before.

Figure 11:
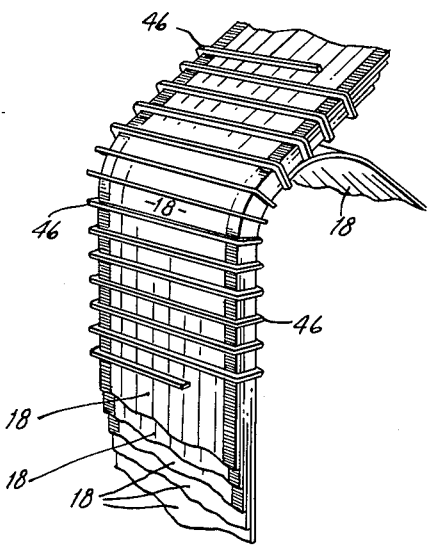
FIG. 11 is a perspective view showing a cable assembly and supporting harness.

In FIG. 11, a plurality of cables 18 in accordance with the present invention are shown assembled in a superposed state supported by helical harness 46. Such a harness can be folded, twisted and otherwise deformed to impart a variety of shapes to the cable. With such a harness, cable can be conveniently tapped or fed in and out of such an assembly at any desired location.

In FIG. 13 a shielded cable in accordance with the present invention is shown, shielding being essential in many applications. In this instance the insulative weft 50 will consist of conductive threads such as 52 wrapped in an insulative wrapping 54. A weft thread having such a structure will effectively shield conductors 20″ from each other.

Although the invention has been described in detail with respect to only several preferred embodiments thereof, it will be understood by those skilled in the art, after reading this specification, that various changes and modifications may be made without departing from the spirit of the invention and the scope of the appended claims.

What is claimed as new and desired to be secured by Letter Patent is.

I claim:

1. An electric cable comprising an elongate weave having a warp formed by electrically conductive and electrically insulative thread and a weft formed by electrically insulative thread, said weft covering the warp on either side thereof, the weft thread on one side of the warp conductors being separate and distinct from the weft thread on the other side of the warp conductors, said weft being interlaced with a warp so as to be withdrawable therefrom in a continuous strand along any desired length on the weave to expose the warp, said weft being removable from one side of the weave, the conductive thread being crimpable and maintained in the weave so that elevations may be crimped therein.

2. An electric cable comprising an elongate weave having a warp formed by electrically conductive and electrically insulative thread and a weft formed by electrically insulative thread, the weft covering the warp on either side thereof, the weft thread covering one side of the warp conductors being separate and distinct from the weft thread on the other side of the warp conductors, the weft on at least one side of the warp conductors including a continuous thread which is looped back and forth across the warp to cover the warp conductors on one side, said weft being interlaced with the warp so as to be withdrawable therefrom in a continuous strand along any desired length on the weave to expose the warp.

3. An electric cable comprising an elongate weave having a warp formed by electrically conductive and electrically insulative thread, and a weft formed by electrically insulative thread, the weft covering the warp on either side thereof, the weft thread covering one side of the warp conductors being separate and distinct from the weft thread on the other side of the warp conductors, the weft on at least one side of the warp conductors including a continuous thread which is looped back and forth across the warp to cover the warp conductors on one side, said weft thread forming a loose frill extending from at least one edge of the weave, said weft being interlaced with the warp so as to be withdrawable therefrom in a continuous strand along any desired length of the weave to expose the warp, the weft including a spaced base weave which is interlocked with the warp and hence not removable as aforesaid.

References Cited by the Examiner

UNITED STATES PATENTS

| 1,696,402 | 12/28 | Horton | 174—117 |
| 2,032,712 | 3/36 | Morrison et al. | |
| 2,810,405 | 10/57 | Huau | 139—383 |

FOREIGN PATENTS

| 260,951 | 1/27 | Great Britain. |

OTHER REFERENCES

German printed application, Steinbach, 1,082,641, June, 1960.

JOHN F. BURNS, *Primary Examiner*.

JOHN P. WILDMAN, LARAMIE E. ASKIN, *Examiners*.